United States Patent
Milota et al.

(10) Patent No.: US 10,936,310 B2
(45) Date of Patent: *Mar. 2, 2021

(54) SYSTEMS AND METHODS FOR INTERFACING A SENSOR AND A PROCESSOR

(71) Applicant: Invensense, Inc., San Jose, CA (US)

(72) Inventors: Andy Milota, San Ramon, CA (US); Mars (Kuang-Li) Lee, San Jose, CA (US); William Kerry Keal, San Jose, CA (US); James B. Lim, San Jose, CA (US)

(73) Assignee: InvenSense, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/708,298

(22) Filed: Dec. 9, 2019

(65) Prior Publication Data
US 2020/0225949 A1 Jul. 16, 2020

Related U.S. Application Data

(63) Continuation of application No. 14/809,748, filed on Jul. 27, 2015, now Pat. No. 10,191,738.

(51) Int. Cl.
*G06F 9/30* (2018.01)
*G06F 13/38* (2006.01)
*G06F 13/10* (2006.01)

(52) U.S. Cl.
CPC ........ *G06F 9/30003* (2013.01); *G06F 9/3017* (2013.01); *G06F 13/102* (2013.01); *G06F 13/385* (2013.01)

(58) Field of Classification Search
CPC .......................... G06F 9/30003; G06F 9/3017
USPC .......................................................... 702/188
See application file for complete search history.

(56) References Cited

U.S. PATENT DOCUMENTS

| | | | |
|---|---|---|---|
| 6,345,375 B1* | 2/2002 | Kelkar | H04L 1/18 714/748 |
| 7,729,887 B2* | 6/2010 | Sherrill | G06F 3/048 702/183 |
| 2001/0006520 A1* | 7/2001 | Moulsley | H04L 12/40058 370/364 |
| 2003/0120841 A1* | 6/2003 | Chang | G06F 11/28 710/52 |
| 2006/0088013 A1* | 4/2006 | Ganesh | H04W 4/00 370/338 |
| 2009/0019429 A1* | 1/2009 | Randow | G06F 11/3664 717/130 |
| 2009/0113053 A1* | 4/2009 | Van Wie | H04L 12/1827 709/226 |
| 2009/0180497 A1* | 7/2009 | Bidenbach | H04L 7/044 370/503 |
| 2012/0235839 A1* | 9/2012 | Mazumdar | H04L 49/15 341/50 |
| 2014/0122143 A1* | 5/2014 | Fletcher | G06Q 10/0631 705/7.14 |

(Continued)

*Primary Examiner* — Ricky Ngon
(74) *Attorney, Agent, or Firm* — Bay Area Technology Law Group (57) ABSTRACT

Systems and methods are disclosed for abstracting a source of sensor data by translating data sink processor communications from a hardware-independent format to a hardware-dependent format and by translating data source portion communications from a hardware-dependent format to a hardware-independent format.

18 Claims, 4 Drawing Sheets

(56) References Cited

U.S. PATENT DOCUMENTS

| | | | |
|---|---|---|---|
| 2015/0333793 A1* | 11/2015 | Rentschler | H04B 1/74 370/228 |
| 2016/0154942 A1* | 6/2016 | Delisle | A61N 1/025 702/189 |

* cited by examiner

SYSTEMS AND METHODS FOR INTERFACING A SENSOR AND A PROCESSOR

FIELD OF THE PRESENT DISCLOSURE

This disclosure generally relates to techniques for providing communications between a sensor and a processor and more specifically to providing an interface for relaying commands and/or data.

BACKGROUND

Advances in technology have enabled the introduction of mobile or portable devices that feature an ever increasing set of capabilities. The ubiquity of devices such as mobile phones, digital still cameras and video cameras, handheld music and media players, portable video game devices and controllers, mobile internet devices (MIDs), personal navigation devices (PNDs), wearables and other similar devices indicates the popularity and desire for these types of devices. Increasingly, such devices are equipped with one or more sensors or other systems for determining the position or motion of the portable device or for measuring one or more aspects of the environment surrounding the portable device. In turn, the data provided by one or more of these sensors may be used in a wide variety of applications and contexts, including navigation, user interface, weather monitoring and prediction, fitness tracking, security and many others.

Although many different technologies may be used depending on the type of sensor and its particular implementation, all sensors at a fundamental level involve at least some hardware portion that is influenced by condition(s) surrounding the device. Correspondingly, by assessing the degree to which the hardware portion is influenced, the sensor may provide a measurement of the condition(s). In order to make use of the sensor measurements, an application processor must be able to communicate with the sensors of the portable device in order to send commands, such as for configuring the sensor, causing it to generate data or otherwise controlling it, as well as to receive data from the sensor in a useful format. At the sensor level, aspects of the communication are typically specific to the particular design of the sensor being used which may vary considerably from vendor to vendor, or even within different versions of sensors provided by a single vendor.

Conventionally then, the application processor must have an awareness of the design of the sensor in order to communicate with it at the hardware level. As will be appreciated, this leads to complications in order to allow the application processor to accommodate different sensor designs. For example, it may be necessary to program the application processor with information covering all the potential sensor designs that may be encountered, increasing the cost and difficulty of implementation. Further, this approach may also require reprogramming the application processor when new sensor designs become available.

In light of these difficulties, it would be desirable to provide a Hardware Abstraction Layer (HAL) in the interface between the sensor and the application processor to facilitate communication. Likewise, it would be desirable to translate functions from the sensor and the application processor between hardware-independent formats and hardware-dependent formats depending on the direction of communication. This disclosure satisfies these and other goals as described in the following materials.

SUMMARY

As will be described in detail below, this disclosure includes a device employing a sensor system, which may have a data sink portion including a data sink processor, a data source portion including a data source processor to receive output from at least one sensor, an interface coupling the data sink portion and the data source portion and a hardware abstraction layer implemented by at least one interface manager to provide an abstraction of the data source portion by translating data sink processor communications from a hardware-independent format to a hardware-dependent format and by translating data source portion communications from a hardware-dependent format to a hardware-independent format.

This disclosure also includes a method for communicating sensor information by providing a data sink portion including a data sink processor, providing a data source portion including a data source processor, receiving output from at least one sensor with the data source processor, coupling the data sink portion and the data source portion with an interface and abstracting the data source portion by translating data sink processor communications from a hardware-independent format to a hardware-dependent format and by translating data source portion communications from a hardware-dependent format to a hardware-independent format.

DETAILED DESCRIPTION

At the outset, it is to be understood that this disclosure is not limited to particularly exemplified materials, architectures, routines, methods or structures as such may vary. Thus, although a number of such options, similar or equivalent to those described herein, can be used in the practice or embodiments of this disclosure, the preferred materials and methods are described herein.

It is also to be understood that the terminology used herein is for the purpose of describing particular embodiments of this disclosure only and is not intended to be limiting.

The detailed description set forth below in connection with the appended drawings is intended as a description of exemplary embodiments of the present disclosure and is not intended to represent the only exemplary embodiments in which the present disclosure can be practiced. The term "exemplary" used throughout this description means "serving as an example, instance, or illustration," and should not necessarily be construed as preferred or advantageous over other exemplary embodiments. The detailed description includes specific details for the purpose of providing a thorough understanding of the exemplary embodiments of the specification. It will be apparent to those skilled in the art that the exemplary embodiments of the specification may be practiced without these specific details. In some instances, well known structures and devices are shown in block diagram form in order to avoid obscuring the novelty of the exemplary embodiments presented herein.

For purposes of convenience and clarity only, directional terms, such as top, bottom, left, right, up, down, over, above, below, beneath, rear, back, and front, may be used with respect to the accompanying drawings or chip embodiments. These and similar directional terms should not be construed to limit the scope of the disclosure in any manner.

In this specification and in the claims, it will be understood that when an element is referred to as being "connected to" or "coupled to" another element, it can be directly connected or coupled to the other element or intervening elements may be present. In contrast, when an element is referred to as being "directly connected to" or "directly coupled to" another element, there are no intervening elements present.

Some portions of the detailed descriptions which follow are presented in terms of procedures, logic blocks, processing and other symbolic representations of operations on data bits within a computer memory. These descriptions and representations are the means used by those skilled in the data processing arts to most effectively convey the substance of their work to others skilled in the art. In the present application, a procedure, logic block, process, or the like, is conceived to be a self-consistent sequence of steps or instructions leading to a desired result. The steps are those requiring physical manipulations of physical quantities. Usually, although not necessarily, these quantities take the form of electrical or magnetic signals capable of being stored, transferred, combined, compared, and otherwise manipulated in a computer system.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present application, discussions utilizing the terms such as "accessing," "receiving," "sending," "using," "selecting," "determining," "normalizing," "multiplying," "averaging," "monitoring," "comparing," "applying," "updating," "measuring," "deriving" or the like, refer to the actions and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments described herein may be discussed in the general context of processor-executable instructions residing on some form of non-transitory processor-readable medium, such as program modules, executed by one or more computers or other devices. Generally, program modules include routines, programs, objects, components, data structures, etc., that perform particular tasks or implement particular abstract data types. The functionality of the program modules may be combined or distributed as desired in various embodiments.

In the figures, a single block may be described as performing a function or functions; however, in actual practice, the function or functions performed by that block may be performed in a single component or across multiple components, and/or may be performed using hardware, using software, or using a combination of hardware and software. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Also, the exemplary wireless communications devices may include components other than those shown, including well-known components such as a processor, memory and the like.

The techniques described herein may be implemented in hardware, software, firmware, or any combination thereof, unless specifically described as being implemented in a specific manner. Any features described as modules or components may also be implemented together in an integrated logic device or separately as discrete but interoperable logic devices. If implemented in software, the techniques may be realized at least in part by a non-transitory processor-readable storage medium comprising instructions that, when executed, performs one or more of the methods described above. The non-transitory processor-readable data storage medium may form part of a computer program product, which may include packaging materials.

The non-transitory processor-readable storage medium may comprise random access memory (RAM) such as synchronous dynamic random access memory (SDRAM), read only memory (ROM), non-volatile random access memory (NVRAM), electrically erasable programmable read-only memory (EEPROM), FLASH memory, other known storage media, and the like. The techniques additionally, or alternatively, may be realized at least in part by a processor-readable communication medium that carries or communicates code in the form of instructions or data structures and that can be accessed, read, and/or executed by a computer or other processor. For example, a carrier wave may be employed to carry computer-readable electronic data such as those used in transmitting and receiving electronic mail or in accessing a network such as the Internet or a local area network (LAN). Of course, many modifications may be made to this configuration without departing from the scope or spirit of the claimed subject matter.

The various illustrative logical blocks, modules, circuits and instructions described in connection with the embodiments disclosed herein may be executed by one or more processors, such as one or more motion processing units (MPUs), digital signal processors (DSPs), general purpose microprocessors, application specific integrated circuits (ASICs), application specific instruction set processors (ASIPs), field programmable gate arrays (FPGAs), or other equivalent integrated or discrete logic circuitry. The term "processor," as used herein may refer to any of the foregoing structure or any other structure suitable for implementation of the techniques described herein. In addition, in some aspects, the functionality described herein may be provided within dedicated software modules or hardware modules configured as described herein. Also, the techniques could be fully implemented in one or more circuits or logic elements. A general purpose processor may be a microprocessor, but in the alternative, the processor may be any conventional processor, controller, microcontroller, or state machine. A processor may also be implemented as a combination of computing devices, e.g., a combination of an MPU and a microprocessor, a plurality of microprocessors, one or more microprocessors in conjunction with an MPU core, or any other such configuration.

Unless defined otherwise, all technical and scientific terms used herein have the same meaning as commonly understood by one having ordinary skill in the art to which the disclosure pertains.

Finally, as used in this specification and the appended claims, the singular forms "a, "an" and "the" include plural referents unless the content clearly dictates otherwise.

As noted above, the techniques of this disclosure are directed to providing an interface between the application processor and one or more sensors by translating functions originating with the application processor from a hardware-independent format to a hardware-dependent format and by translating functions originating with the sensor from a hardware-dependent format to a hardware-independent format. Notably, this allows the application processor to communicate by means of high level functions with logical descriptions that are not dependent on the specific design of the sensor. The term application processor is used to indicate any processor that runs the application requesting the data or does any data processing of data intended for the application. The application processor may be, for example, the main processor of the host device, or a dedicated processor for the application(s).

Figure 1:
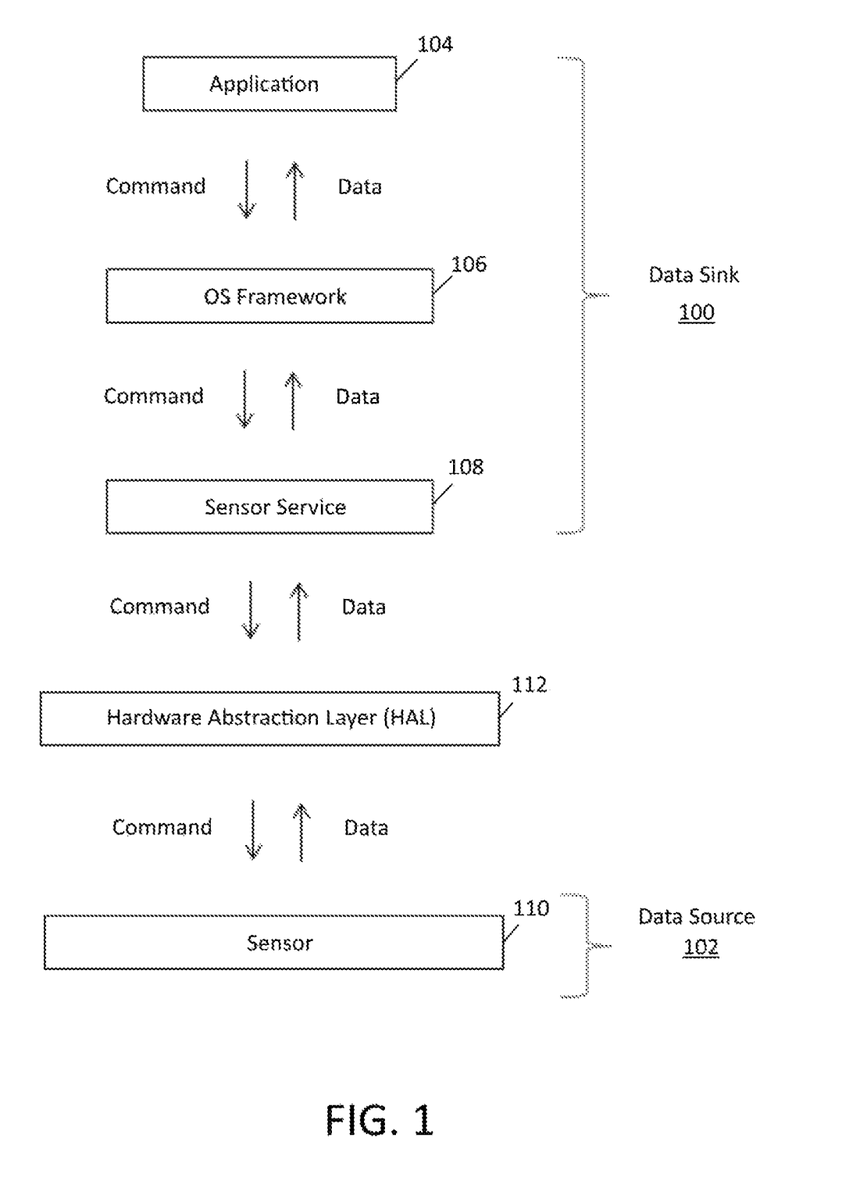
FIG. 1 is a schematic diagram of communications between a data sink portion and a data source portion according to an embodiment.

To help illustrate these and other aspects of the disclosure, FIG. 1 schematically illustrates the flow of information involved in communications between an application processor and a sensor according to one embodiment of the disclosure. As shown, the communication may be conceptualized as occurring between a data sink portion 100 that ultimately uses the data provided by a data source 102 portion. At the top of data sink portion 100 is an application layer 104, that may include one or more application processors configured to execute programs stored in memory. Application layer 104 provides the functionality of the device that is experienced by the user, typically in the form of programs (i.e., applications) that employ the sensor data. Next, an operating system framework layer 106 manages the hardware and software resources of the portable device to create an environment in which programs at the application layer 104 may be run. A sensor service layer 108 may provide specific instances for each sensor being used by the higher layers. In these higher layers, the term sensor may be used for hardware sensors or software sensors. A hardware sensor refers to an actual physical sensor, such as for example an accelerometer that measures the acceleration of the device. An example of a software sensor is an orientation sensor which determined the orientation of the device. Any software sensor is based on data from a hardware sensor, in this case the motion sensors used to determine the orientation. In the remainder of this disclosure, the term sensor refers to a hardware sensor, by the data from these sensors may be converted into a software sensor at any level.

Correspondingly, the data source portion 102 may include a sensor layer 110 featuring one or more sensors. Communications between data sink portion 100 and data source portion 102 are provided through a HAL layer 112. As will be described some or all aspects of HAL layer 112 may be implemented in data sink portion 100, in data source portion 102 or in both.

In a representative example of a command flow when sensor data is needed by an application, a request may originate at application layer 104 and be passed to OS framework layer 106, which is then transferred to sensor service layer 108. At this stage, these hardware-independent commands are delivered to HAL layer 112 for translation to a hardware-dependent format and delivered to sensor layer 110. In one aspect, the request originating with application layer 104 may be translated by HAL layer 112 to configure the sensor at sensor layer 110 to produce the data requested by the application. Correspondingly, data output at sensor layer 110 flows to HAL layer 112, where a translation may be performed from a hardware-dependent format to a hardware-independent format if required. The translated data may then be passed in sequence from sensor service layer 108 to OS framework layer 106 and finally to application layer 104.

Figure 2:
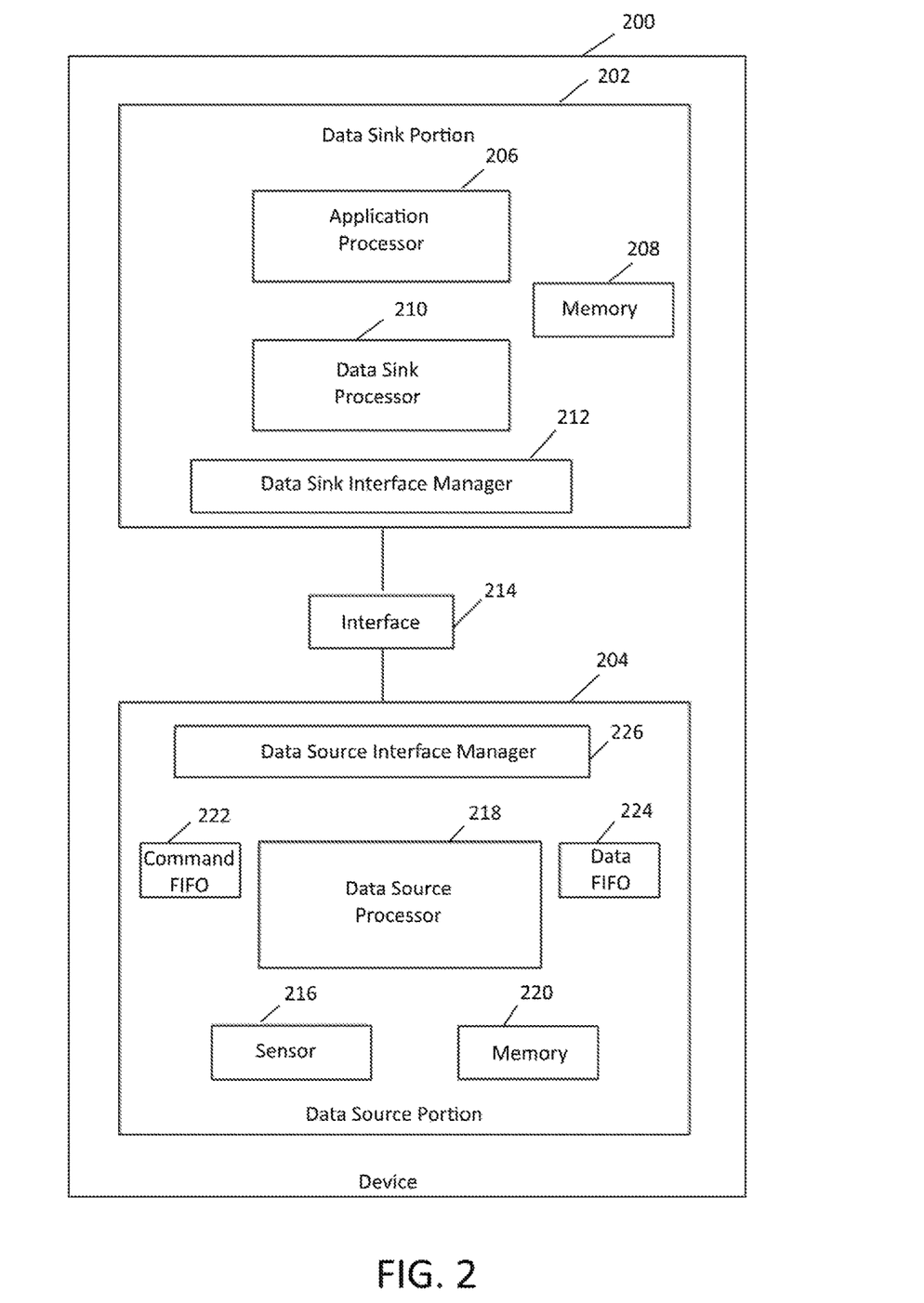
FIG. 2 is a schematic diagram of a device employing a hardware abstraction layer according to an embodiment.

The commands flowing down, and the data flowing back up in FIG. 2 may contain different types of information. For example, a command may be that the application layer 104 would like to know which sensors are present or supported in the data source 102. In this case, the data would contain a list of these sensors. Therefore, the term 'data' does not refer only to pure sensor data, but to all information flowing back up from the data source 102. Similarly, the term 'command' may refer to all information flowing down from the data sink 100. For example, the data sink 100 may want to load a certain program or algorithm into the data source 102. In this case, the program or algorithm code may be considered the 'command'.

Details regarding one embodiment of an electronic device 200 are depicted as high level schematic blocks in FIG. 2. As will be appreciated, device 200 may be implemented as a device or apparatus, such as a handheld device that can be moved in space by a user and its motion, location and/or orientation in space therefore sensed. For example, such a handheld device may be a mobile phone (e.g., cellular phone, a phone running on a local network, or any other telephone handset), tablet, personal digital assistant (PDA), video game player, video game controller, navigation device, wearable device (e.g., glasses, watch, belt clip), fitness tracker, virtual or augmented reality equipment, mobile internet device (MID), personal navigation device (PND), digital still camera, digital video camera, binoculars, telephoto lens, portable music, video or media player, remote control, or other handheld device, or a combination of one or more of these devices.

As shown, device 200 has a data sink portion 202 and a data source portion 204 as described above. Although one data source portion 204 is depicted, any suitable number of data source portions may be provided depending on the capabilities and sensors of device 200. The different data source portions or modules can be connected in parallel to the data sink portion, and each data source portion may be specialized in a certain group of sensors, for example motion, video, or audio sensors. In general, data sink portion 202 may include application processor block 206, which may represent one or more microprocessors, central processing units (CPUs), or other processors to run software programs, which may be stored in memory 208, associated with the functions of device 200. In one aspect, application processor 206 may execute a program that employs data from one or more sensors of device 200. Multiple layers of software can be provided in memory 208, which may be any combination of computer readable medium such as electronic memory or other storage medium such as hard disk, optical disk, etc., for use with application processor 206. For example, an operating system layer can be provided as described above for device 200 to control and manage system resources in real time, enable functions of application software and other layers, and interface application programs with other software and functions of device 200. Similarly, different software application programs such as menu navigation software, games, camera function control, navigation software, communications software, such as telephony or wireless local area network (WLAN) software, or any of a wide variety of other software and functional interfaces can be provided. In some embodiments, multiple different applications can be provided on a single device 200, and in some of those embodiments, multiple applications can run simultaneously.

Further, data sink portion 202 may also include data sink processor block 210 representing processing being performed to generate commands corresponding to requests for sensor data from application processor 206, to pass received sensor data to application processor 206 and/or to perform any other operations associated with the HAL. For example, data sink processor 210 may implement a sensor service layer. Data sink processor 210 may be separate from application processor 206 or may be the same processor, which may or may not be dedicated for these specific functions. The data sink processor 210 may be a processor, such as a MCU, designed to offload some tasks from the main or application processor, so as to e.g. keep this processor asleep during some tasks.

In some embodiments, data sink portion 202 has a data sink interface manager 212 configured to put commands and data being exchanged with data source portion 204 in the correct format and to control the communication and transfer of data between the respective portions. Data sink interface manager 212 may be incorporated in separate processors or chips, or may be part of any of the other components or processors. For example, data sink interface manager 212 may be implemented as software instructions stored in memory 208 and executed by data sink processor 210. However, any suitable combination of processing and memory resources may be employed by data sink interface manager 212, which may be any combination of hardware, software and firmware. As such, aspects implemented in software may include but are not limited to, application software, firmware, resident software, microcode, etc., and may take the form of a computer program product accessible from a computer-usable or computer-readable medium providing program code for use by or in connection with a computer or any instruction execution system, such as application processor 206, data sink processor 210, another dedicated processor or any other processing resources of device 200.

Data sink portion 202 may be coupled to data source portion 204 through interface 214, which may be any suitable bus or interface, such as a peripheral component interconnect express (PCIe) bus, a universal serial bus (USB), a universal asynchronous receiver/transmitter (UART) serial bus, a suitable advanced microcontroller bus architecture (AMBA) interface, an Inter-Integrated Circuit (I2C) bus, a serial digital input output (SDIO) bus, a serial peripheral interface (SPI), interrupt line, dedicated data line, or other equivalent. Depending on the architecture, interface 214 may also be used to couple other components of device 200, such as application processor 206, memory 208 and others, or another dedicated bus may be employed.

Data source portion 204 may include one or more sensors 216, or may otherwise be in communication with such sensors, data source processor 218 and memory 220. Memory 220 may store algorithms, routines or other instructions for processing data output by sensor 216 and/or other sensors as described below using logic or controllers of sensor processor 218, as well as storing raw data output by sensor 216 or other sensors. Data source processor 218 may be configured to execute commands from data sink portion 202 regarding requests for sensor data and correspondingly to provide the requested data. Accordingly, data source processor 218 may have one or more buffers, such as command first in first out (FIFO) buffer 222 and data FIFO buffer 224. Any suitable buffer architecture and queueing strategy may be employed. Data source portion 204 may be implemented as an integrated chip or as any number of separate components. The data sink portion 202 may also have one or more buffers as desired, such as a command FIFO (not shown in FIG. 2) to which commands are written that have to be transferred to the data source portion 204.

In some embodiments, data source portion 204 has a data source interface manager 226 configured to put commands and data being exchanged with data sink portion 202 in the correct format and to control the communication and transfer of data between the respective portions. Data source interface manager 226 may be incorporated in separate processors or chips, or may be part of any of the other components or processors. For example, data source interface manager 226 may be implemented as software instructions stored in memory 220 and executed by data source processor 218. However, any suitable combination of processing and memory resources may be employed by data source interface manager 226, which may be any combination of hardware, software and firmware.

The library of information used by data sink processor 210 and data sink interface manager 212 to understand the command and control any data source portions being employed may be stored using any suitable memory resources, such as memory 208. An interpreter or decoder may be used to convert the commands and information. This may be the general purpose or main/application memory, or may be a dedicated memory. As noted, data sink processor 210 and data sink interface manager 212 may be implemented as separate processors, and each processor may include a corresponding dedicated memory for this purpose if desired.

As noted, data sink portion 202 may comprise any number of physical processors, from one to several, corresponding to application processor 206, data sink processor 210 and data sink interface manager 212. These may, or may not, be in a single chip or package. In one aspect, data sink processor 210 and data sink interface manager 212 may be combined into a single processor, which communicates with application processor 206. Alternatively, data sink processor 210 and data sink interface manager 212 may also be part of application processor 206, or any other processor in communication with the application processor. Application processor 206 may transfer any requests/commands related to sensor data to be used by a running application to data sink processor 210. Once data sink processor 210 has received the commands, the processing resources associated with this block may handle all the required actions, even if the command is complex and requires a plurality of actions, thus unloading such tasks from application processor 206. Data sink processor 210 then communicates with data source portion 204 through interface 214 and one or both of data sink interface manager 212 and data source interface manager 226. As shown, the HAL may include data sink interface manager 212 and data source interface manager 226, along with interface 214 in one embodiment. Any suitable division of functionality may be employed by the two interface managers. Alternatively, the functions of the interface managers may be provided by a single interface manager implemented either on the data sink side of interface 214 or the data source side.

As desired, data sink interface manager 212 may be able to perform some high level operations associated with the data source portion(s). For example, data sink interface manager 212 may be able to stop and start (activate/deactivate) a data source portion. Data sink interface manager 212 may also be able to reset/initialize a module or control the power mode of a data module, e.g. setting the module in a low-power mode. To perform these functions, data sink interface manager 212 has access to the register addresses of the data source portions, such as the FIFO and/or other memory addresses of data source portion 204, so it can route sensor commands to the correct destination, such as command FIFO 222. In such embodiments, data interface manager 212 may also know the pipe address of the data source portions(s) so as to use the correct communication channel. This aspect facilitates operations when more than one data source portion 204 is employed in parallel. For example, there may be a data source portion related to motion sensors, another related to image sensors, yet another related to environmental sensors and so on. By using the appropriate pipe address of the different data source portions, the interface manager may control the correct portion. As will be appreciated, data sink interface manager 212 supports a modular design, where a plurality of data source portions may be addressed and controlled in parallel, with data sink interface manager 212. In one aspect, data sink interface manager 212 may have access to the registry, FIFO addresses and other hardware-dependent parameters of the data source portions. When a new data source portion is to be accommodated, data sink interface manager 212 may be updated with the appropriate information if new hardware addresses are involved.

In embodiments in which data sink interface manager 212 is tasked with a relatively greater portion of system control functions, data source interface manager 226 may be responsible for reception of commands issued by data sink processor 210 and placing them in the correct register, FIFO, or memory addresses, such as command FIFO 222. Further, data source interface manager 226 may perform an error check on the incoming command, or may check if the commands are known to the data source portion 204. In case of unknown commands, data source interface manager 226 may return a 'not acknowledged' message or otherwise indicate an error.

Data source processor 218 may read any pending commands from command FIFO 222, and may be configured to complete each command before processing the next. Using this architecture, data sink portion 202 may queue a plurality of commands in command FIFO 222, allowing one or more aspects of data sink portion 202 to operate in a power saving mode while data source processor 218 executes the commands. Data source processor 218 reads the commands from command FIFO 222 and converts them to the necessary functions and steps indicated by the commands. Data source processor 218 may have all the information required, such as register and memory addresses and the like, to control the sensor or sensors in data source portion 204. This library of information may be stored in memory 220, which may be dedicated to this function or may be general purpose.

Correspondingly, sensor data output by sensor 216, such as may be requested by commands sent by data sink portion 202, may be put in one or more data FIFOs 224 in data source portion 204. Once the data is in the FIFO, an interrupt may be sent to data sink portion 202 indicated the data is ready for retrieval. This interrupt may be transmitted through interface 214 or may be a dedicated line. The data flows back to data sink portion 202 through interface 214, and one or both of data sink interface manager 212 and data source interface manager 226, depending on the architecture, and may be written to dedicated or general purpose memory resources, such as memory 208.

Different types of interrupts may be used when the data is ready for retrieval. For example, the interrupt may be a 'wake-up' interrupt or a 'non-wake-up' interrupt. The wake-up interrupt means that as soon as the data is ready, the application processor, or any other processor that will receive the data, is woken up to indicate that the data is ready. This process may be referred to as a tightly coupled system or loop because the process that requested the data will retrieve the data and use it as soon as the data becomes available. On the other hand, the non-wake-up interrupt may be used for data that is less urgent. In this case, the interrupt is send when the data is ready, but if the processor is asleep it is not woken up. The processor will retrieve the data once it wakes up, may be due to some other process causing the wake up. This process may be referred to as a loosely coupled system or loop because the process that requested the data may not retrieve the data immediately, but at a later time at the convenience of the processor.

Sensor 216 may be one or more components capable of measuring or detecting motion or orientation of device 200 or any environmental condition surrounding device 200. Data source portion 204 may implement one or any desired number of sensors and a plurality of data source portions may operate in parallel. Further, each sensor may directly output measurements that are sent to data sink portion 202 or data source processor 218 may implement a virtual sensor that generates a signal derived from one or more other sensors. For example, rotational motion sensors, such as gyroscopes, may measure angular velocity along one or more orthogonal axes and linear motion sensors, such as accelerometers, may measure linear acceleration along one or more orthogonal axes and a sensor fusion operation may be performed to combine the data and provide a motion determination. Similarly, data from an air pressure sensor indicating altitude and/or data from a magnetometer indicated heading may be fused with the motion determination. Without limitation, sensor 216 may include any of an accelerometer, a temperature sensor, a gravity sensor, a gyroscope, an ambient light sensor, a linear acceleration sensor, a magnetometer, an orientation sensor, a pressure sensor, a proximity sensor, a hygrometer, a rotation vector sensor, an image sensor or an acoustic sensor. In some embodiments, sensor 216 may be implemented using Micro Electro Mechanical System (MEMS) to be integrated with data source processor 218 to provide data source portion 204 in a single package. Exemplary details regarding suitable configurations of integrated sensors and processors may be found in co-pending, commonly owned U.S. patent application Ser. No. 11/774,488, filed Jul. 6, 2007, and Ser. No. 12/106,921, filed Apr. 21, 2008, which are hereby incorporated by reference in their entirety. Suitable implementations are available from InvenSense, Inc. of Sunnyvale, Calif.

The type of processing performed by data source processor 218 may depend on the type of sensor data that is requested and/or the type of sensors available in data source portion 204. For example, data sink processor 210 may issue a request for direct acceleration data at a certain rate, and sensor 216 may be an accelerometer, such that data source processor 218 sets the rate of the accelerometer output and places values output by sensor 216 in data FIFO 224. As another example, application processor 206 may need the orientation of device 200, and sensor 216 of data source portion 204 may include an accelerometer, a gyroscope, and/or a magnetometer. Accordingly, data source processor 218 may function as a sensor hub and collect the data from the different sensors and perform sensor fusion to implement a virtual orientation sensor that determines the orientation of device 200 and outputs the data to data FIFO 224.

In some embodiments, data source portion 204 may contain more than one data source processors that each control one or more sensors. These different processors may communicate in order to share data that may be required for some sort of data fusion in one of the processors. For example, one processor may control an accelerometer while another processor may control a gyroscope, with the sensor fusion using both sets of data being performed by one of the processors. Further, in some embodiments, sensor fusion may also require sensor data from a plurality of data source portions 204. As such, the respective interface managers may enable the communication between the different modules to exchange data and perform the sensor fusion in one of the data source processors. Alternatively, sensor fusion using data from different data source portions may be performed by data sink processor 210 or application processor 206. An example of this type of fusion may be a context determination to indicate how device 200 is currently being used with acoustic and motion sensors, with the acoustic and motion sensors in different data source portions. Different architectures may be employed to achieve desired performance characteristics. Application processor 206 and data sink processor 210 may provide more capabilities but represent a relatively greater expenditure of power, while data source processor 218 may have reduced computational resources but represent greater efficiency.

In one embodiment, the sensor system of device 200 may include one data sink portion 202 and one or more data source portions 204 as noted above. In another embodiment, the sensor system of device 200 may include more than one data sink portion 202 and only one data source portions 204. In this case, the data from sensor 216 is transferred to the plurality of data sink portions 202, where each data sink portion 202 may have its own data sink interface manager 212 to receive the data and its own data sink processor 210 to handle the data. An example of such a system may be a smartphone equipped with an Optical Image Stabilization (OIS) system. Here, the gyroscope sensor data is provided to a first data sink portion 202 represented by the OIS system which uses the gyroscope data to determine how to move the optical element to compensate for the movement of the device. A second data sink portion 202 may be represented by the operating system which may use the data for determining the motion, movement, or gestures of the phone.

Another embodiment may be a distributed system or a system with more than one device, such that several data sink portions 202 may exist in different devices. For example, the system may consist of a combination of a smart phone and a smart watch. Each may have a data sink portion, which may access its own data source portions as well as one or more data source portions of the other device. Data sink interface manager 214 may control communication with the data source portion in the other device, and may also communicate with the data sink portion of the other device, for example to coordinate tasks that may need sensor data from both devices, or simply to make the other data sink module aware of the processes. The communication between the devices may be done using any kind of wireless communication technique or protocol.

In embodiments described above, the sensor data is put in data FIFO 224 and an interrupt is used to indicate availability of the data to data sink portion 202. As such, an interrupt may be sent after each data sample. Alternatively, application processor 206 may request data samples for a certain amount of time and be notified when collection is complete. Accordingly, data source processor 218 may put all the data samples in data FIFO 224 and send an interrupt upon completion, allowing one or more processors or other resources of data sink portion 202 to operate in a power save mode while the collection is occurring.

In some embodiments, data source processor 218 may employ multiple output FIFOs to accommodate different classes of sensor data. For example, device 200 may be configured to awaken application processor 206 upon detection of a predefined event, such as a shake of device 200. To avoid having the detection of the event placed behind other collected data in one FIFO, dedicated FIFOs may be provided for data collection, event detection and/or other classes of sensor data. Accordingly, a shake event detection may be placed directly in a corresponding FIFO rather than behind other collected data so that an interrupt will be sent to data sink portion 202 without delay.

In some embodiments, the command and requested data may be attributed a certain level of priority. This priority may be attributed by any layer in the data sink 100, such as application layer 104, the operating system framework layer 106, or the sensor service layer 108. The priority may also be attributed by any part of the HAL layer 112, such as the data sink processor 210, the data source processor 218, the data sink interface manager 212, or the data source interface manager 226. The data source portion 204 may have a plurality of command FIFOs 222, each attributed to a certain priority to avoid that commands with a high priority are delayed behind command with a lower priority. A high priority command may be capable of interrupting a process started by a lower priority command, e.g. in order to avoid waiting for the data source processor to finish the process started by the lower priority command. (Different priority command FIFOs may also exist in the data sink portion 202.) The data source portion 204 may also have a plurality of data FIFOs 224, each for storing data with a certain priority. This avoids data that has to be provided to the data sink portion 202 with a high priority to be stuck or delayed behind data with a lower priority. The commands and data with different priorities may be processed by different data source processors, each dedicated for a certain priority level. A low priority processor may process high priority data if no low priority data is requested (and vice versa).

Communication involving data sink portion 202 and data source portion 204 may take place at a number of levels. As a first example, communication within data sink portion 202 may include the exchange of information between application processor 206 and data sink processor 210, such as requests for sensor data from application processor 206 and delivery of sensor data by data sink processor 210. Suitable communications may include queries regarding what sensors/activities are supported, commands to activate or deactivate a certain sensor, requests to monitor activity at given intervals, directions to configure the sensor data rate, and other similar information. The exchange of information between application processor 206 and data sink processor 210 may represent high level commands or low level commands, such as data type, data rate, accuracy, and the like. As will be appreciated, the level of the command may dictate where the processing takes place. For example, application processor 206 may request an activity update, such that data sink processor 210 or data source processor 218 performs the activity determination using data from sensor 216 and reports it, or may request motion sensor data, such that application processor 206 performs the routines to determine activity on its own.

Communications may also occur between data sink portion 202 and data source portion 204. At this level, data sink processor 210 sends commands to the appropriate data source portion(s) 202, depending on the received request/command from application processor 206. While data sink processor 210 may be able to communicate using hardware-dependent parameters supplied by data sink interface manager 214 and/or data source interface manager 226 corresponding to existing data source portions or those added later, the hardware-dependent parameters are not required at the application or OS framework levels. For example, application processor 206 may send commands to activate a sensor and set an appropriate data output rate in a hardware-independent format while the HAL represented by data sink interface manager 214 and/or data source interface manager 226 may perform the translation to a hardware-dependent format.

Further, communications may also occur within data source portion 204, such as between data source processor 218 and sensor 216 depending on the request received from data sink processor 210. This communication is specific to sensor 216 and may only cover the appropriate sensor. At this level, the exact registry and memory addresses may be known to data source processor 218. Examples of such communications include commands to read a specific memory address corresponding to data FIFO 224 to access sensor data, to start sensor calibration and the like.

In one embodiment, communication at each of the levels described above may be provided in a packetized manner. Each packet may include a logical destination field, a length field and a payload field. The logical destination may be used to indicate the location to which the packet is to be delivered, and may represent any of the described components of data sink portion 202 and data source portion 204. For example, a packet may be addressed to a processor, such as application processor 206, data sink processor 210, or data source processor 218, a specific sensor, such as sensor 216, one of a plurality of data source portions 202, as well as other suitable locations. The use of a logical destination address allows use of interface 214 in the form of a bus that couples multiple components, so that packets received at destinations other than identified by the address may be ignored. The length field may be used to specify the total length of each packet, so that individual packets may be parsed correctly. The payload may include sensor data or one or more commands, which may be executed in order of receipt. The amount of sensor data included in each packet may vary as desired, depending on how the sensor data was requested by application processor 206 for example. As an illustration, data sink processor 210 may receive a data request from application processor 206 through a sensor service layer, and generate one or more packets with the corresponding commands. In response to the request packets, data source portion 204 may generate one or more packets with the sensor data. Accordingly, data sink processor 210 may then process and unpack the data for transfer to the sensor service layer, where it is made available to application processor. The packetizing at the data sink portion 202 and data source portion 204 may occur at different levels by different processors. For example, any data generated by sensor 216 may be initially stored in data FIFO 224, and then packetized by data source processor 218 and/or data source interface manager 226 before transmission to the data sink portion 202. Alternatively, the data from sensor 216 may be packetized by the data source processor 218 before storing it in the data FIFO 224 as packet(s). In other words, in the data FIFO 224, the sensor data may be in package format or not. This applies also to the commands in the command FIFO 222 which may be in packet format or not.

Figure 3:
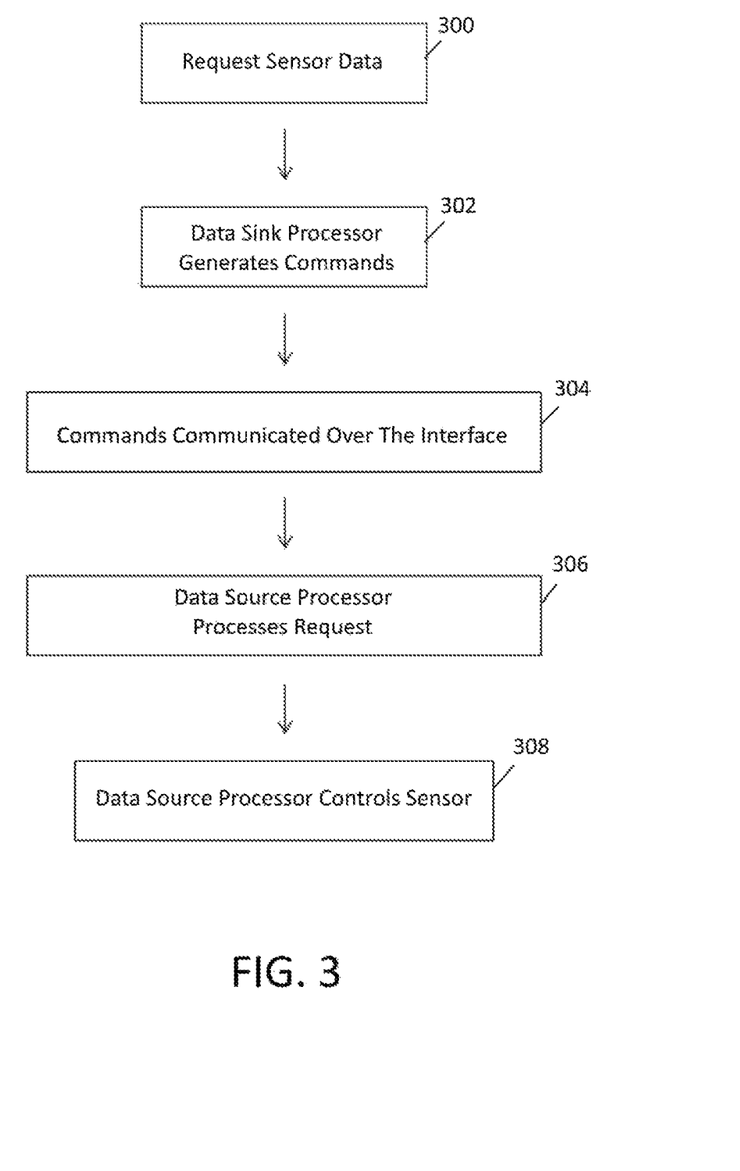
FIG. 3 is a flowchart showing a routine for requesting sensor data according to an embodiment.

One exemplary routine illustrating aspects of this disclosure for requesting sensor data is represented by the flowchart depicted in FIG. 3. Beginning with 300, application processor 206 may request a particular type of data, and may further specify characteristics of the requested data, such as a particular data rate. For example, accelerometer data may be requested at a 50 Hz rate. The sensor service layer provides this request to data sink processor 210, which processes the request in 302. This may include generating one or more command packets as described above. Data sink processor 210, such as through data sink interface manager 212, may also include hardware-dependent parameters to translate the request from a hardware-independent format to a hardware-dependent format, thereby implementing the HAL. This may include determining the appropriate pipe, register, memory, FIFO or other addresses. Data sink interface manager 212 may then transmit the packet(s) to any data source portions(s) 204 present in device 200 over interface 214 in 304. In turn, data source processor 218 may process the request in 306. Based on the logical destination address, data sink interface manager 212 and/or data source interface manager 226 may queue the packets in data FIFO 222 corresponding to the appropriate data source processor 218. Data source processor 218 may execute the request by communicating with sensor 216 in 308. In this example, this may include setting the appropriate data rate as well as directing sensor 216 to begin outputting data to data FIFO 224.

Figure 4:
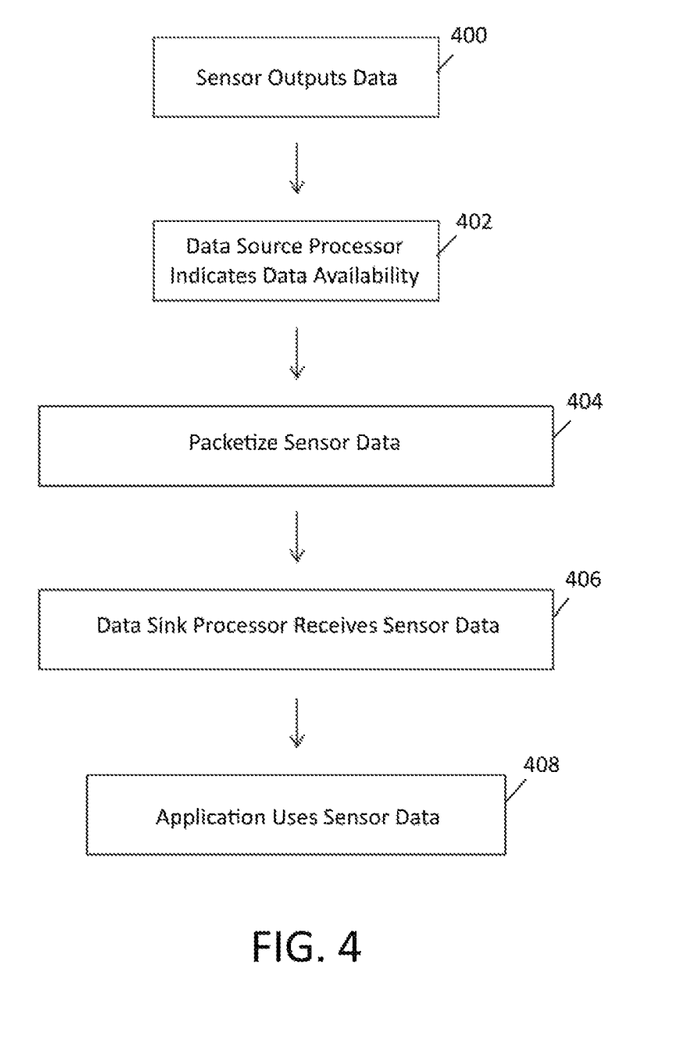
FIG. 4 is a flowchart showing a routine for supplying sensor data according to an embodiment.

Likewise, another exemplary routine for transmitting sensor data is represented by the flowchart depicted in FIG. 4. Beginning with 400, in response to a request such as described above, sensor 216 may output data to data FIFO 222. In 402, data source processor 218 may send an interrupt to data sink portion 202 when the sensor data is ready for retrieval. Then, in 404, data source interface manager 226 may put the sensor data in a data packet addressed to data sink processor 212. Upon being received, data sink processor 212 unpacks the payload of each packet, which is supplied to the sensor service layer in 406 for use by application processor in 408.

As noted, data source processor 218 and sensor(s) 216 may be integrated as a single chip or package. Any associated FIFOs and memory may also be integrated into the same chip or package. In such implementations, the chip or package may be provided with all the required information and knowledge to perform its designed functions representing a 'plug and play' solution. In other embodiments, the sensor may not be integrated with data source processor 218 and control of the sensor may be performed at a higher level. Any hardware-dependent parameters, such as register, FIFO, or other memory addresses, may be provided by one or both of data sink interface manager 214 and data source interface manager 226, depending on the embodiment. The information may also be provided as a driver used by data sink processor 210 to allow communication with sensor 216 using low level commands. In other words, any functionality missing in the data source portion 204 to control sensor 16 may be moved to the data sink portion 202, for example in the data sink processor 210 or the data sink interface manager 212. Such embodiments may be used to accommodate older sensor designs to provide backward compatibility.

In the described embodiments, a chip is defined to include at least one substrate typically formed from a semiconductor material. A single chip may be formed from multiple substrates, where the substrates are mechanically bonded to preserve the functionality. A multiple chip includes at least two substrates, wherein the two substrates are electrically connected, but do not require mechanical bonding. A package provides electrical connection between the bond pads on the chip to a metal lead that can be soldered to a PCB. A package typically comprises a substrate and a cover. Integrated Circuit (IC) substrate may refer to a silicon substrate with electrical circuits, typically CMOS circuits. MEMS cap provides mechanical support for the MEMS structure. The MEMS structural layer is attached to the MEMS cap. The MEMS cap is also referred to as handle substrate or handle wafer. In the described embodiments, an MPU may incorporate the sensor. The sensor or sensors may be formed on a first substrate. Other embodiments may include solid-state sensors or any other type of sensors. The electronic circuits in the MPU receive measurement outputs from the one or more sensors. In some embodiments, the electronic circuits process the sensor data. The electronic circuits may be implemented on a second silicon substrate. In some embodiments, the first substrate may be vertically stacked, attached and electrically connected to the second substrate in a single semiconductor chip, while in other embodiments the first substrate may be disposed laterally and electrically connected to the second substrate in a single semiconductor package.

As one example, the first substrate may be attached to the second substrate through wafer bonding, as described in commonly owned U.S. Pat. No. 7,104,129, which is incorporated herein by reference in its entirety, to simultaneously provide electrical connections and hermetically seal the MEMS devices. This fabrication technique advantageously enables technology that allows for the design and manufacture of high performance, multi-axis, inertial sensors in a very small and economical package. Integration at the wafer-level minimizes parasitic capacitances, allowing for improved signal-to-noise relative to a discrete solution. Such integration at the wafer-level also enables the incorporation of a rich feature set which minimizes the need for external amplification.

Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the present invention.

What is claimed is:

1. A data sink comprising:
   at least one data sink processor;
   an interface for coupling the data sink with a data source portion having at least one sensor and at least one buffer; and
   a hardware abstraction layer implemented by at least one interface manager to provide an abstraction of the data source portion by translating data sink processor communications from a hardware-independent format to a hardware-dependent format.

2. The data sink of claim 1, wherein the hardware abstraction layer translates data source portion communications from a hardware-dependent format to a hardware-independent format.

3. The data sink of claim 1, wherein the interface is configured to couple with a plurality of data source portions and wherein the interface manager provides an abstraction of the plurality of data source portions.

4. The data sink of claim 3, wherein the interface is further configured to couple the plurality of data source portions with each other.

5. The data sink of claim 3, wherein the data sink processor is configured to perform a sensor fusion operation using information from the plurality of data source portions.

6. The data sink of claim 1, wherein the interface is configured to couple the data source portion with at least one additional data sink.

7. The data sink of claim 1, wherein the at least one data sink processor is configured to access at least one command buffer of the data source portion through the hardware abstraction layer.

8. The data sink of claim 1, wherein the at least one data sink processor is configured to access at least one data buffer of the data source portion through the hardware abstraction layer.

9. The data sink of claim 8, wherein the at least one data sink processor is configured to receive an interrupt from the data source portion that indicates availability of sensor data in the data buffer.

10. The data sink of claim 8, wherein the at least one data sink processor is configured to be activated by an interrupt from the data source portion.

11. The data sink of claim 8, wherein at least one data sink processor is configured to cause the data source portion to store output from the at least one sensor when the data sink is in power save mode.

12. The data sink of claim 1, wherein the at least one data sink processor is configured to access at least one two buffers of the data source portion through the hardware abstraction layer and wherein the at least two buffers are assigned different priorities.

13. The data sink of claim 12, wherein the at least two of the plurality of buffers are data buffers and wherein the data sink processor is configured to receive different interrupts indicating availability of sensor data in the data buffers.

14. The data sink of claim 1, wherein communications between the data source portion and the data sink are packetized.

15. The data sink of claim 14, wherein a packet routed through the interface comprises a logical destination address within one of the data sink and the data source portion.

16. The data sink of claim 1, wherein the at least one sensor is a motion sensor.

17. The data sink of claim 1, wherein the hardware abstraction layer is configured to translate a request for sensor data generated by the data sink processor.

18. The data sink of claim 17, wherein the hardware abstraction layer is configured to translate a specification from the data sink processor of characteristics for the requested sensor data.

* * * * *